US008848788B2

(12) United States Patent
Lu et al.

(10) Patent No.: US 8,848,788 B2
(45) Date of Patent: Sep. 30, 2014

(54) METHOD AND APPARATUS FOR JOINT QUANTIZATION PARAMETER ADJUSTMENT

(75) Inventors: Xiaoan Lu, Princeton, NJ (US); Qian Xu, Plainsboro, NJ (US); Cristina Gomila, Princeton, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 387 days.

(21) Appl. No.: 12/800,263

(22) Filed: May 12, 2010

(65) Prior Publication Data
US 2010/0290524 A1 Nov. 18, 2010

Related U.S. Application Data

(60) Provisional application No. 61/178,957, filed on May 16, 2009, provisional application No. 61/269,976, filed on Jul. 1, 2009.

(51) Int. Cl.
*H04N 7/32* (2006.01)
*H04N 19/124* (2014.01)
(Continued)

(52) U.S. Cl.
CPC ..... *H04N 19/00157* (2013.01); *H04N 19/0009* (2013.01); *H04N 19/002* (2013.01); *H04N 19/00781* (2013.01); *H04N 19/00278* (2013.01)
USPC .................................................. 375/240.03

(58) Field of Classification Search
CPC ......... H04N 7/12; H04N 11/04; H04N 14/04; H04N 19/00157; H04N 19/0009; H04N 19/00096; H04N 7/26085; H04N 7/26154
USPC ............ 375/240.03, 240.29, 240.16, 240.08, 375/240.25, 240.12, 240.02, 240.23, 240.18

IPC .................................... H04N 7/12,11/04, 14/04
See application file for complete search history.

(56) References Cited

U.S. PATENT DOCUMENTS 5,481,309 A * 1/1996 Juri et al. ................. 375/240.03
6,535,251 B1 3/2003 Ribas-Corbera
(Continued)

FOREIGN PATENT DOCUMENTS

EP 1507416 2/2005
FR 2914125 9/2008
(Continued)

OTHER PUBLICATIONS

An MPEG Encoder Incorporating Perceptually Based Quantisation, 1997 IEEE TENCON—Speech and Image Technologies for Computing and Telecommunications, p. 731-734, Wilfred Osberger, Sean Hammond and Neil Bergmann.*
(Continued)

*Primary Examiner* — Jay Au Patel
*Assistant Examiner* — Francis G Geroleo
(74) *Attorney, Agent, or Firm* — Robert D. Shedd; Reitseng Lin

(57) ABSTRACT

The present principles provides a method and apparatus for jointly adjusting the rounding offset and the quantization step size on a macroblock level to improve the perceptual quality of the fine details of the encoded image. In one implementation, the content of the pictures is analyzed and the smooth regions are identified. A quantization step size value for the picture is initially defined and a rounding offset is adaptively assigned to each macroblock based on the content characteristics. The quantization step size is then calculated for the a particular macroblock according to another content characteristic of the macroblock such that the encoding of the particular macroblock is performed in response to the calculated quantization step size and the rounding offset value of the first block.

5 Claims, 5 Drawing Sheets

(51) Int. Cl.
*H04N 19/154* (2014.01)
*H04N 19/61* (2014.01)
*H04N 19/14* (2014.01)
*H04N 19/176* (2014.01)

(56) References Cited

U.S. PATENT DOCUMENTS

| | | | |
|---|---|---|---|
| 7,889,790 B2* | 2/2011 | Sun | 375/240.03 |
| 8,059,721 B2* | 11/2011 | Chang et al. | 375/240.18 |
| 2002/0181583 A1 | 12/2002 | Corbera | |
| 2003/0002581 A1 | 1/2003 | Moni et al. | |
| 2005/0286786 A1* | 12/2005 | Noda | 382/239 |
| 2006/0098733 A1* | 5/2006 | Matsumura et al. | 375/240.03 |
| 2006/0215914 A1 | 9/2006 | Aleksic et al. | |
| 2007/0140334 A1 | 6/2007 | Sun | |
| 2007/0237236 A1 | 10/2007 | Chang et al. | |
| 2008/0240235 A1 | 10/2008 | Holcomb et al. | |
| 2008/0240257 A1* | 10/2008 | Chang et al. | 375/241 |
| 2009/0180536 A1 | 7/2009 | Shimofure | |

FOREIGN PATENT DOCUMENTS

| | | | |
|---|---|---|---|
| WO | WO2008116836 | 10/2008 | |
| WO | WO 2009/048501 A2 * | 4/2009 | H04N 7/50 |
| WO | WO2009048501 | 4/2009 | |
| WO | WO2009091548 | 7/2009 | |

OTHER PUBLICATIONS

He et al.:"A Linear Source Model and a Unified Rate Control Algorithm for DCT Video Coding," IEEE Transactions on Circuits and Systems for Video Technology, vol. 12, No. 11, Nov. 2002, pp. 970-982.

Lu et al.:"A New Spatial Activity Metric for Film Contents," IEEE, Corporate Research, Thomson Inc, Princeton, 2007, pp. VI-473-VI 476.

"Advanced Video coding for Generic Audiovisual Services," ITU-T Telecommunication Standardization Sector of ITU, H.264, May 2003, pp. 1-263.

"Advanced Video Coding for Generic Audiovisual Services," ITU-T Telecommunication Standardization Sector of ITU, H.264, Mar. 2005, pp. 1-325.

Yuan et al.:"Offset-Adaptive Quantization in DCT-based Low-Britate Video Coding," IEEE, 2004, pp. 2739-2743.

Westerink et al.:"Two-pass MPEG-2 Variable-bit-rate Encoding," IBM J. Res. Develop. vol. 43, No. 4, Jul. 1999, pp. 471-488.

"10 Rate Control and Quantization Control," http://mpeg.org/MPEG/MSSG/tm5/CH10/CH10.html, Dec. 4, 2009, pp. 1-5.

* cited by examiner

METHOD AND APPARATUS FOR JOINT QUANTIZATION PARAMETER ADJUSTMENT

CROSS-REFERENCE TO RELATED APPLICATIONS

This application claims the benefit of the filing date of U.S. Provisional Application Ser. No. 61/178,957, filed on May 16, 2009, entitled "Method and Apparatus for Improved Quantization Rounding Offset Adjustment for Video Codec" and the filing date of U.S. Provisional Application Ser. No. 61/269,976, filed on Jul. 1, 2009, entitled "Quantization Parameter Adjustment", the contents of which are hereby incorporated by reference in their entirety, for all purposes.

TECHNICAL FIELD

The present principles relate generally to video encoding and decoding and, more particularly, to methods and an apparatus for improved quantization parameter adjustment.

BACKGROUND

Most video applications seek highest possible perceptual quality given the bit rate constraints. For instance, in a low bit rate application such as a videophone system, a video encoder may provide higher quality by eliminating the strong visual artifacts at the regions of interest that are visually more important. On the other hand, in a high bit rate application, visually lossless quality is expected everywhere in the pictures and a video encoder should also achieve transparent quality. One challenge in obtaining transparent visual quality in high bit rate applications is to preserve details, especially at smooth regions where loss of details are more visible than that at the non-smooth regions because of the texture masking property of the human visual system.

Increasing the bit rate is one of the most straightforward approaches to improve the quality. When the bit rate is given, an encoder manipulates its bit allocation module to spend the available bits to obtain the highest possible quality. In non-real-time applications such as DVD authoring, the video encoder can facilitate a variable-bit-rate (VBR) design to produce a video with a constant quality on both difficult and easy contents over time. In such applications, the available bits are appropriately distributed over the different video segments to obtain constant quality. In contrast, a constant-bit-rate (CBR) system assigns the same number of bits to an interval of one or more pictures despite their different encoding difficulties and produces visual quality that varies with the video content. For both VBR and CBR encoding systems, an encoder can allocate bits according to perceptual models within a picture. One characteristic of human perception is texture masking, which explains why human eyes are more sensitive to loss of quality at the smooth regions than in textured ones. This property can be utilized to increase the number of bits allocated to the smooth regions to obtain high visual quality.

Quantization process in a video encoder controls the number of encoded bits and the quality most intimately. It is common to adjust the quality through adjusting the quantization parameters. In the following, we use H.264/AVC as the example to explain the quantization process. Other standards, such as H.263 and MPEG-2 follow similar procedures. Mathematically, in the encoder the transformed coefficient W is quantized as:

$$Z = \left\lfloor \frac{|W|}{q} + s \right\rfloor \cdot \text{sgn}(W), \quad (1)$$

where Z is the quantization level. Here, q is the quantization step size and s is the quantization rounding offset. The function $\lfloor . \rfloor$ rounds a value to the nearest integer and sgn(.) returns the sign of a signal. When the quantization matrix is applied, the coefficients are scaled first before the quantization process at the encoder. The range of W where it is quantized to 0 is called the deadzone. In this particular case, the deadzone is $=\Delta=(1-s) \times q^x$ 2 while the deadzone range is $(-(1-s) \times q, (1-s) \times q)$. At the decoder, the quantization level Z is reconstructed to the signal W'. This is called inverse quantization and is described mathematically as:

$$W' = q \cdot Z. \quad (2)$$

The syntax in H.264/AVC allows q to be different for each macroblock (MB). The value of q is selected from the ones indexed by parameter QP, an integer in the range of 0-51. The rounding offset parameter s, is not involved in the inverse quantization and the encoder has the flexibility of setting it to any value.

Existing MPEG-4 AVC video encoders usually assume the quantization rounding offset is constant and only adjust the quantization step size to adjust the number of bits and therefore the quality. As can be seen from (1), the rounding offset has pronounced control over the small coefficients as it directly controls how the small near-zero coefficients are quantized. When we increase s, fewer coefficients are quantized to zeros and more bits are spent on the small coefficients given the quantization step size q. When the rate is given, an increased s needs to operate with a coarser q to meet the bit rate constraints. Therefore increasing the rounding offset may preserve the small coefficients at the cost of more distortions to the large coefficients. Since preserving small coefficients preserves fine details, including but not limited to film grain and computer-generated noise, in reconstructed video, adjusting rounding offset values can be very effective in obtaining high perceptual quality for some applications, such as Blu-Ray DVD authoring where transparent visual quality is expected.

SUMMARY

According to one aspect, the present principles propose to jointly adjust the quantization step size and rounding offset to improve the perceptual quality, in particular, to preserve the fine details at the smooth regions.

In accordance with one implementation, the method for encoding an image using rate control in an encoder include defining (215) a quantization step size value for a picture, defining (215) a rounding offset value for a block of said picture according to a first characteristic of said block, and encoding (245) the block responsive to said quantization step size value and said rounding offset value of said block.

A quantization step size value of the block is computed according to a second characteristic of said block and said quantization size value of said picture such that the said encoding step encodes said block responsive to the quantization step size value of said block and the rounding offset value of said block.

In accordance with the present implementation a rounding offset value of the picture is calculated according to said quantization step size value of the picture, and the rounding offset difference for the block is calculated such that said step of defining said rounding offset value for said block comprises adding said rounding offset value of said picture and said rounding offset difference for said block.

In accordance with another implementation, the encoder includes a processor and associated memory. The processor is configured to define a quantization step size value for a picture, create a map representing variations of quantization step sizes among blocks within the picture (ΔQP map), and to create a rounding offset map (RO map) representing rounding offset values for each block in the picture. The rounding offset values for each block are based on a first characteristic of each block. A rate control module within the encoder is configured to calculate a base quantization step size index (base QP) based on the created ΔQP map and RO map such that the encoder encodes each block using the calculated base quantization step size index (base QP).

According to one implementation, the encoder processor is further configured to calculate a quantization step size value for each block in the picture according to a second characteristic of each block and the quantization step size value for the picture. Thus, the encoder encodes each block in response to the quantization step size value and rounding offset value for each block. According to another exemplary implementation, the definition of the rounding offset for a particular block is determined by adding the rounding offset value of the picture to the rounding offset difference for the particular block.

According to a further implementation, the first characteristic includes a measure of smoothness of each picture and the second characteristic includes the texture of each block of the picture.

These and other aspects, features and advantages of the present principles will become apparent from the following detailed description of exemplary embodiments, which is to be used in connection with the accompanying drawings.

BRIEF DESCRIPTION OF THE DRAWINGS

The present principles may be better understood in accordance with the following exemplary figures, in which.

DETAILED DESCRIPTION

Figure 1:
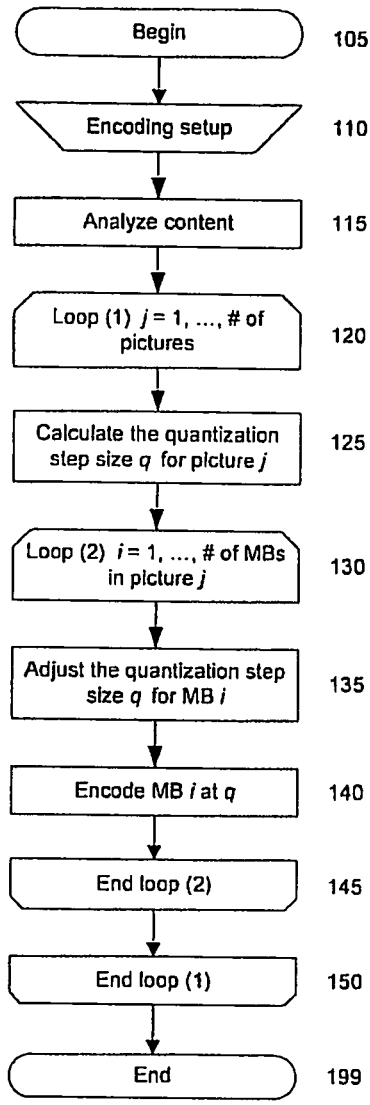
FIG. 1 is a flow diagram showing a method for quantization adjustment to improve perceptual quality in a video encoder, in accordance with the prior art.

The present principles are directed to methods and apparatus for improved quantization step size and rounding offset adjustment for video encoding and decoding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functional ities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

Additionally, as used herein, the phrase "picture region" (or simply "region" for short") refers to a portion of a picture encompassing and/or otherwise formulated from, for example, one or more blocks or arbitrary shapes of any size. The one or more blocks may relate to, for example, a super macroblock, a macroblock, a macroblock partition, a sub-macroblock partition, and so forth.

Moreover, as used herein, the phrase "portion of a video sequence" refers to one or more Groups of Pictures (GOPs), one or more pictures included in or independent of one of more GOPs, and/or one or more scenes.

Further, as used herein, the phrase "input coding unit" refers to any of a picture (e.g., frame or field), picture region, and/or slice.

Also, as used herein, the phrase "default rounding offset" refers to the rounding offset (i.e., constant rounding offset) that is typically used by a particular video encoder and/or decoder, such as that used with respect to, for example, a video coding standard, recommendation, extension thereof, and so forth with which such video encoder and/or decoder operates in compliance with.

Additionally, as used herein, the word "signal" refers to indicating something to a corresponding decoder. For example, the encoder may signal a particular one of a group of rounding offsets in order to make the decoder aware of which particular rounding offset was used on the encoder side. In this way, the same function may be used at both the encoder side and the decoder side. Thus, for example, an encoder may transmit a particular rounding offset to the decoder so that the decoder may use the same particular rounding offset or, if the decoder already has the particular rounding offset as well as others, then signaling may be used (without transmitting) to simply allow the decoder to know and select the particular rounding offset. By avoiding transmission of any actual rounding offsets, a bit savings may be realized. It is to be appreciated that signaling may be accomplished in a variety of ways. For example, one or more syntax elements, flags, and so forth may be used to signal information to a corresponding decoder.

Further, the term "bit rate" as used herein, is defined as the number of encoded bits (or target number of bits) for a set of frames divided by the time span of these frames.

In at least one implementation, we propose a method to effectively improve the perceptual quality by adjusting both the quantization step size and rounding offset. The proposed method aims to preserve fine details in the reconstructed video. This is especially important to the smooth areas where the loss of fine details is highly noticeable.

Most existing rate control algorithms assume a constant rounding offset within a picture and adjusts the quantization step size to obtain the target bit rates. In the context of adaptive rounding offset adjustment, the rate control method should be adjusted in order to accommodate the variation in rounding offsets and regulate the bit rate accurately.

Those of skill in the art will appreciate that one generally important aspect in improving the perceptual quality is to preserve the fine details, such as film grain and computer-generated noise. It may be especially important to the smooth areas where the loss of fine details is highly noticeable. A common approach in existing algorithms is to encode these smooth regions at finer quantization step sizes. In the following example, we use TM5 (Test Model, version 5), to illustrate how higher quality is obtained for smooth regions within a picture when implementing the method of the present invention. Those of skill in the art will appreciate that the Test Model evolved in parallel with the MPEG video working draft. The TM series was a joint effort between ITU-T SG15.1 (known then as CCITT SG XV, Working Party XV/1, Experts Group on ATM video Coding) and ISO/IEC JTC1/SC29 WG11 (MPEG).

1. TM5 Perceptual Rate Control

In TM5, a spatial activity measure is computed for MB j of size 16×16 from the four frame-organized luminance sub-blocks (n=1, ..., 4) and the four field-organized luminance sub-blocks (n=5, ..., 8) using the original pixel values:

$$act_j = 1 + \min(vblk_1, vblk_2, \ldots, vblk_8), \quad (3)$$

where $$vblk_n = \frac{1}{64} \times \sum_{k=1}^{64} (P_k^n - P_{mean_n})^2, \quad (4)$$

and $$P_{mean_n} = \frac{1}{64} \times \sum_{k=1}^{64} P_k^n, \quad (5)$$

where $P_k^n$ are the sample values in the $n^{th}$ original 8×8 sub-block. The number of required sub-blocks in equation (3) can be fewer or more depending on the size of the sub-block. $act_j$ is then normalized to:

$$N\_act_j = \frac{2 \times act_j + avg\_act}{act_j + 2 \times avg\_act}, \quad (6)$$

where avg_act is the average value of $act_j$ of the previous encoded picture. On the first picture, avg_act is set to 400. Obtain the quantization step size for MB j as:

$$q_j = q \times N\_act_j, \quad (7)$$

where q is a reference base quantization step size for the corresponding picture. Among various possible solutions to obtain q, one example as in TM5 is to use a model with only one parameter: c=b(q)*q, where b is the number of bits of a picture, q is the quantization step size, and c is a constant model parameter. This model assumes that: (1) c is the same for adjacent frames of the same frame type; and (2) c is a constant for a picture as q varies. So, q for the current picture can be easily determined based on the b and q from the immediate preceding encoded frame or all preceding encoded frames and the target bit rate for the current picture. In both cases, the preceding frames used are usually of the same picture type (e.g., Intra/Inter picture). After q is determined, q, for MB j is calculated from equation (7). The value of $q_j$ is mapped to Quantization Parameter, $QP_j$, which is an index value for the quantization step size. Finally, $QP_j$ is clipped to the range [1 . . . 31] and is used to indicate the quantization parameter for MB j during encoding.

Those of skill in the art will recognize and appreciate that in alternative implementations the unit of b can be the number of encoded bits or the bit rate, so long as the same unit is used in all cases. In addition, q for the first picture in the sequence can either be obtained from a look up table or can be a fixed value based on the encoding parameters.

Furthermore, those of skill in the art will appreciate that the target bit rate of the current picture depends on the visual quality requirement and the rate allocation scheme used for the same. An example of the visual quality requirement is that we require the Intra picture and Inter P picture have similar quality for smooth transitions. Specifically, we set the target bit rate of Intra picture B_I as 3*B_P where B_P is the target bit rate of a P frame. For the rate allocation scheme, a simple example is the constant bit rate (CBR) coding, where pictures of the same type have the same target bit rate. Suppose there are 1 Intra picture and (n−1) P pictures in one second, and the target bit rate is B, we would have B=B_I/N+(n−1)*B_P/n= (n+2)*B_P/n. Thus, we can easily derive B_P and B_I.

Therefore, in a TM5 quantization scheme, a smooth MB with a smaller variance has a smaller value of a spatial activity measure $act_j$ and $N\_act_j$, and a finer quantization step size indexed by $QP_j$. With finer quantization for a smooth MB, more fine details can be preserved and higher perceptual quality can be obtained.

The perceptual model in equation (6) can also be applied to the rate control in H.264. In one embodiment, the weight $N\_act_j$ is used to adjust the QP offset for each MB:

$$\Delta QP_j = 6 * \log_2(N\_act_j) \quad (8)$$

In H.264, increase of 1 in QP means an increase of quantization step size by about 12%. After the QP for the current picture is calculated, using equation (7), the QP for $MB_j$ will be $$QP_j = QP + \Delta QP_j. \quad (9)$$

Note QP is the index for the quantization step size q, which, for example, can be obtained in a manner described above along with equation (7). In the following, we use "ΔQP map" to represent the ΔQP values for all MBs in a picture.

2. "RO map" Algorithm

In various implementations we utilize the rounding offset adjustment in the quantization process to improve the visual quality. The algorithm is denoted as "RO map". Its first stage is to analyze the content and identify the smooth regions in the pictures. Based on the content characteristics, we assign the rounding offset adaptively to each MB.

The "RO map" algorithm begins by classifying the MBs into smooth and textured ones based on the variance. In the film contents, a perceptually smooth region can have a large variance due to the film grain. In order to remove the effect of film grain at measuring the smoothness, we deploy the variance-based metric:

$$\sigma_{new}^2 = \max(0, \sigma^2 31 \sigma_{grain}^2), \quad (10)$$

where $\sigma^2$ is the variance of the MB, $\sigma_{grain}^2$ rain is the estimated variance of the film grain. A MB is considered smooth if $\sigma_{new}^2 < T_\sigma$ and textured otherwise, where $T_\theta$ is a pre-defined threshold.

After the content classification, we set the rounding offset as:

$$s = \begin{cases} s_{smth}, & \text{if the } MB \text{ is "smooth"} \\ s_{tex}, & \text{if the } MB \text{ is "textured"} \end{cases} \quad (11)$$

The selection of $s^{smth}$ and $S^{tex}$ depends on the content characteristics and the target bit rate. In the following, we use "RO map" to represent the s values for all MBs in a picture.

As a variation, we can set the rounding offset for the smooth area to $s+\Delta s_{smith}$, and $s+\Delta s_{tex}$ for the textured area, where s will be determined by the encoder. In the following, we use "ΔRO map" to represent the Δs values for all MBs in a picture.

As described above, various implementations adjust either the quantization step size or the rounding offset in the encoder in order to preserve fine details at smooth regions.

In at least one implementation, we propose to jointly adjust the quantization step size and rounding offset to improve the perceptual quality, in particular, to preserve the fine details at the smooth regions.

Typical Quantization Adjustment to Improve Perceptual Quality

FIG. 1 illustrates the typical quantization adjustment process to improve the perceptual quality in a video encoder according to the prior art. The encoding process starts at block 105 and ends at block 199. The only adjustable quantization parameter in such a system is the quantization step size. The rounding offset parameter is constant throughout the encoding process. The encoder setup is performed on block 110, typically with the aid of an operator. The encoder setup may involve the setup of the target bit rate as well as the specification of any set of parameters involved in the encoding process. The input video is analyzed in block 115. In case of CBR encoding, the task for content analysis may include minor adjustment of the target number of bits for the current picture based on its content. In case of VBR, the content analysis module can include the actual encoding of the whole video in order to obtain the coding complexity and adaptively allocate available bits to the video. In block 125, a reference quantization step size, q, is calculated for picture j from the target number of bits. In block 135, the quantization step size q for a MB is adjusted based on its content (e.g., using equation (8)) and/or the previous encoding results. For example, a smooth MB will lower q to improve the perceptual quality. In another example, if the previous MBs use more bits than assigned ones, the current MB will increase q to consume fewer bits than what is originally assigned. Those of skill in the art will appreciate that this calculation can be based on the ρ-domain rate model (see for example, Z. He and S. K. Mitra, "A linear source model and a unified rate control algorithm for DCT video coding," IEEE Transactions on Circuits and System for Video Technology, November 2002.) or TMN8 rate model, just to name a few examples. The MB is encoded in block 140 at q. The encoding process ends after all MBs in the picture are encoded.

In this approach, a fixed rounding offset is applied to all encoded pictures and only the quantization step size is adjusted. For example, in many 1-1.264 video encoding applications the rounding offset is by default set to 1/3.0 and 1/6.0 for an INTRA and INTER picture, respectively. Given the bit rate constraints, adjusting the quantization step size alone cannot always provide the highest possible perceptual quality to a video segment. What is more, a fixed rounding offset does not always fit the various video characteristics.

Joint Quantization Step Size and Rounding Offset Adjustment

Figure 2:
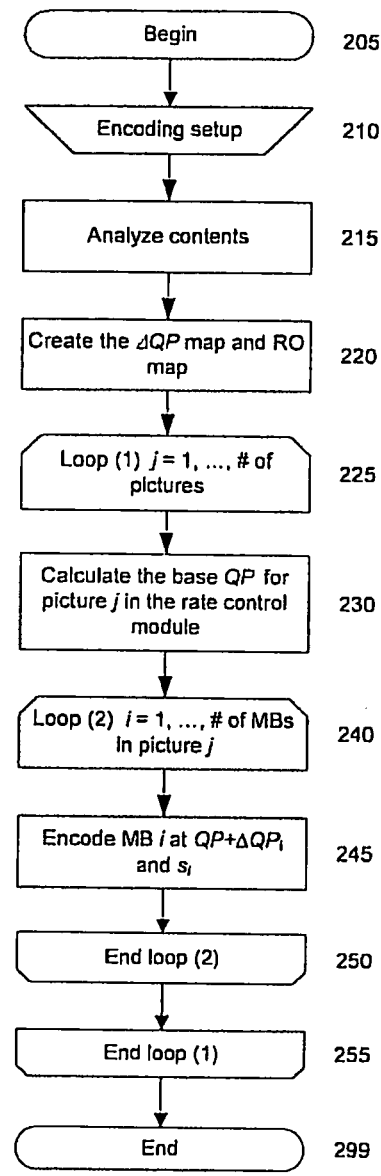
FIG. 2 is a flow diagram showing an example of the method for quantization step size and rounding offset selection to improve the perceptual quality according to an implementation of the invention.
Figure 3:
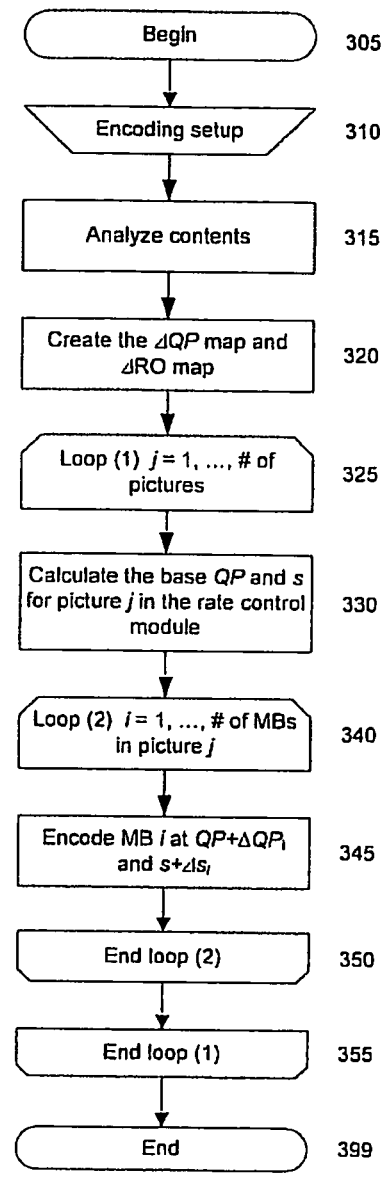
FIG. 3 is a flow diagram showing another example of the method for quantization step size and rounding offset selection to improve the perceptual quality according to another implementation of the invention.

As suggested above, in at least one implementation of the present principles, we propose to jointly adjust the rounding offset s and the quantization step size on a MB level to improve the perceptual quality. FIGS. 2 and 3 illustrate some exemplary embodiments that include the rounding offset and the quantization step size in the quantization adjustment process.

Embodiment 1

FIG. 2 illustrates how both the quantization step size and rounding offset are adaptively selected to improve the perceptual quality, according to an implementation of the present principles. In this method, the encoder analyzes the content to decide a rounding offset s automatically for each MB (e.g., using equation (11)), where the rounding offset values are stored and denoted as a rounding offset map ("RO map"). On the other hand, quantization step sizes (QPs) are also adaptively selected for each MB. Some MBs are encoded with larger QPs because the content is textured. How the QPs vary among MBs are stored in a $\Delta QP$ map (e.g., using equation (8)). Based on the "RO map" and $\Delta QP$ map, the encoder selects a base QP for the picture in the rate control module. QP for each MB is then decided from the base QP and the $\Delta QP$ map.

As part of this method, block 215 analyzes the content and block 220 is responsible for creating the "RO map" and $\Delta QP$ map. In block 230, we calculate the base quantization step size index QP given the bit rate constraint, the "RO map", and $\Delta QP$ map. From the obtained base QP, we encode the $i^{th}$ MB in block 245 at QP+$\Delta QP_i$ and $S_i$.

In this method, the rounding offset value is decided for each MB before encoding. The advantage of this method is that it is easier to apply the rate control. The disadvantage is that it no longer adjusts the rounding offset during the encoding process and will not be able to obtain the highest rate control accuracy.

Embodiment 2

FIG. 3 illustrates a variation of the method described in FIG. 2, where all steps are substantially similar to those in FIG. 2, with the exception of steps 320, 330, and 345. In this implementation, how the rounding offsets vary among the MBs is stored in a $\Delta RO$ map (step 320). The base rounding offset s and base QP are decided for the picture in the rate control module (step 330). For the encoding (step 345), QP for each MB is then decided from the base QP and $\Delta QP$ stored in the $\Delta QP$ map; similarly, s for each MB is from s and $\Delta s$ stored in the $\Delta RO$ map. Compared with the method in FIG. 2, this method provides more flexibility in the QP and s selection for each MB and has the potential to get higher rate control accuracy while still providing good perceptual quality.

A Rate Control Method when Applying the "Ro Map"

Most existing rate control algorithms assume a constant rounding offset and only adjusts the quantization step size to obtain the target bit rates. In the context of "RO map" where the rounding offset can change from MB to MB within a picture, the rate control algorithm should be adjusted in order to regulate the bit rate accurately.

In our encoder we use the $\rho$-domain rate control algorithm, which adjusts q based on a linear model:

$$R = \theta(1-\rho), \quad (12)$$

where R is the number of bits, $\theta$ is the model parameter, and $\rho$ is the ratio of zero DCT coefficients. After the transform coefficients become available, for any q, the corresponding $\rho$ can be obtained as follows:

$$\rho = \frac{1}{L} \sum_{W \in D(q,s)} h(W), \quad (13)$$

where L is the number of coefficients in the frame, h(W) is the number of the DCT coefficients that equal to W, and D(q, s) is the deadzone for the quantization parameters of q and s. With a one-to-one mapping between p and q, the p-domain rate control identifies q after p is calculated.

When an "RO map" is used, the rounding offset varies from MB to MB. Assuming we classify the contents into only two categories: smooth and textured, and the rounding offsets choose from $s_{smth}$ and $s_{tex}$, our method modifies $\rho$ calculation to:

$$\rho = \frac{1}{L}\left(\sum_{W \in D(q,s_{smth})} h(W) + \sum_{W \in D(q,s_{tex})} h(W)\right); \quad (14)$$

where $D(q, s_{smth})$ and $D(q, s_{tex})$ are the deadzones for the smooth and textured regions, respectively. The calculation can be extended to accommodate more choices of rounding offsets within a picture. In a practical implementation, the $\rho$ calculation can be obtained using the look-up-table (LUT) method. In this context, we generate multiple look-up tables and each table corresponds to a rounding offset value. This way, an encoder can select a combination of rounding offset value and quantization size that provide closest estimate to a target bit rate.

Variation

When the above method provides higher accuracy in rate control, it may require extra computational complexity and more storage space. To simplify the rate control module, we can assume that the average rounding offset is used for the whole picture and we can then apply any existing rate control method. The average can be computed as an arithmetic mean or a geometric mean. This method is not as accurate as the above method. But when there are many choices of rounding offsets in a picture, it can save the computation significantly.

Rate Control Method when Applying the "$\Delta RO$ Map"

To perform rate control when a "$\Delta RO$ MAP" is used, we need to determine the base QP and base s for a picture. To simplify the rate control module, we first derive for the picture the base s, assuming that the same rounding offset is used for the whole picture. Using the $\rho$-domain rate control as the example, multiple $\rho$-QP mappings need to be created, and each mapping corresponds to one s. The combination of QP and s that provides the closest estimate to the target bit rate should be used for the picture. For MB j, the encoder will use $QP_j = QP + \Delta QP_j$ and $s_j = s + \Delta s_j$ for encoding.

Figure 4:
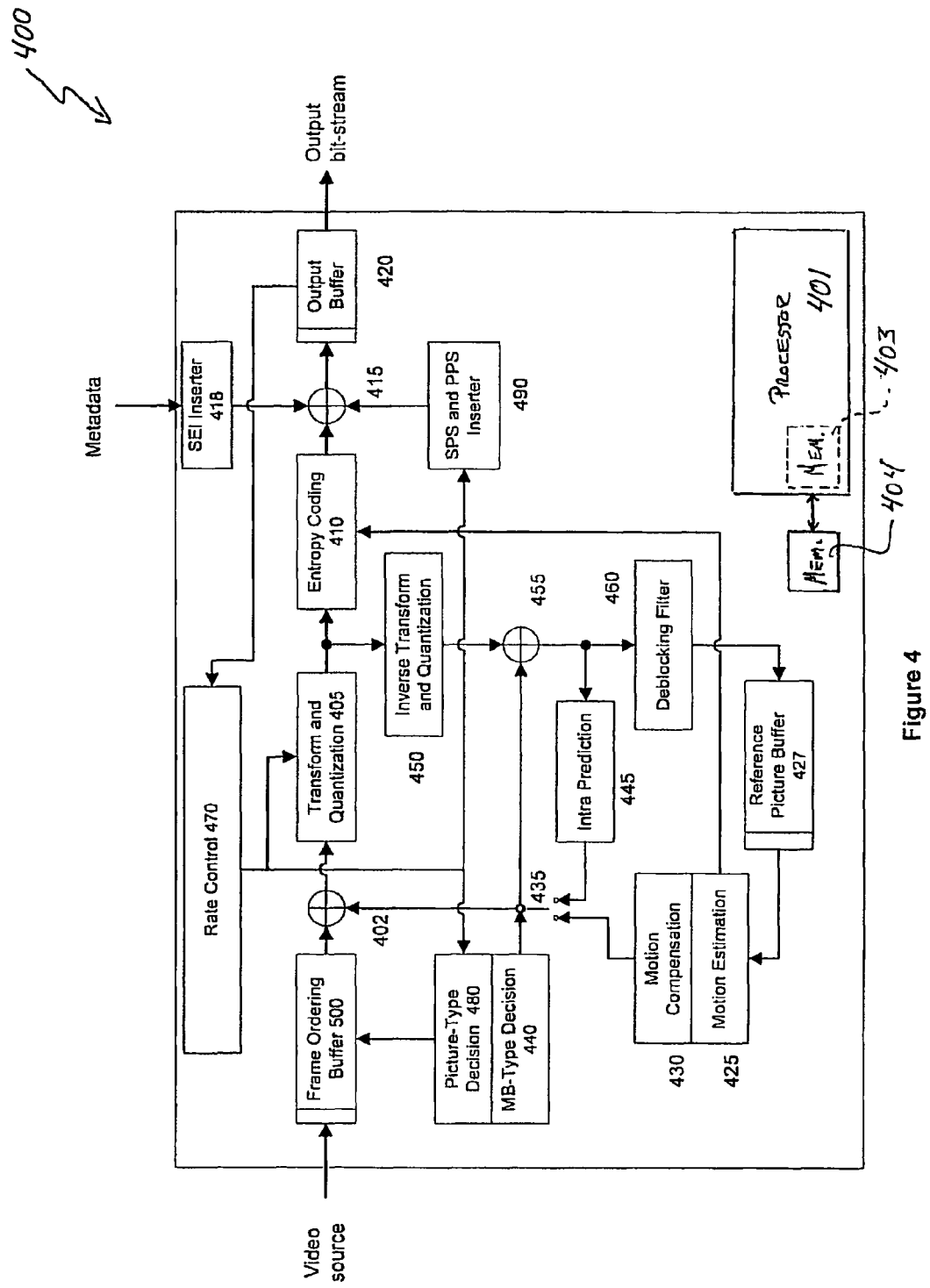
FIG. 4 is a block diagram showing an exemplary video encoder to which the present principles may be applied, in accordance with an implementation of the present principles.

FIG. 4 illustrates the block diagram of a predictive encoder that could perform the encoding process of block 245/345 in FIGS. 2 and 3, respectively.

Turning to FIG. 4, an exemplary video encoder to which the present principles may be applied is indicated generally by the reference numeral 400. The encoder 400 includes a frame ordering buffer 500. A first input of the frame ordering buffer 500 is available as an input to the encoder 400. An output of the frame ordering buffer 500 is connected in signal communication with a first non-inverting input of a combiner 402. An output of the combiner 402 is connected in signal communication with a first input of a transformer and quantizer 405. An output of the transformer and quantizer 405 is connected in signal communication with a first input of an entropy coder 410 and an input of an inverse transformer and quantizer 450. An output of the entropy coder is connected in signal communication with a first non-inverting input of a combiner 415. An output of the combiner 415 is connected in signal communication with an input of an output buffer 420. A first output of the output buffer 420 is connected in signal communication with an input of a rate controller 470. An output of the rate controller 470 is connected in signal communication with a second input of the transformer and quantizer 405, an input of a picture-type and macroblock (MB) type decision module 440, and an input of a Sequence Parameter Set (SPS) and Picture Parameter Set (PPS) inserter 490. A first output of the picture-type and macroblock-type decision module 440 is connected in signal communication with a second input of the frame ordering buffer 500. A second output of the picture-type and macroblock-type decision module 440 is connected in signal communication with a first non-inverting input of a combiner 455, a second non-inverting input of the combiner 402, and with an output of a switch 435. An input of the switch 435 is connected in signal communication with either a second output of a motion compensator/motion estimator 430/425 or an output of an intra prediction module 445. An output of the combiner 455 is connected in signal communication with an input of the intra prediction module 445 and an input of a deblocking filter 460. An output of the deblocking filter 460 is connected in signal communication with an input of a reference picture buffer 427. An output of the reference picture buffer 427 is connected in signal communication with an input of the motion compensator/motion estimator 430/425. A first output of the motion compensator/motion estimator 430/425 is connected in signal communication with a second input of the entropy coder 410. An output of the SPS and PPS inserter 490 is connected in signal communication with a second non-inverting input of the combiner 415. An output of a Supplemental Enhancement Information (SEI) inserter 418 is connected in signal communication with a third non-inverting input of the combiner 415. An input of the SEI inserter 418 is available as an input to the encoder 400, for receiving metadata. A second output of the output buffer 420 is available as an output of the encoder 400, for outputting a bitstream.

The encoder 400 also includes some computational capabilities in the form of at least one processor 401 in bi-directional communication with a memory 404. Alternatively, the memory could be on board or part of the processor 401, as shown in the example of FIG. 4 with memory 403. Those of skill in the art will appreciate that all of the above described components of the encoder 400 are in signal communication with the processor 401 which functions as the primary controller of the encoding operation according to the implementations of the present invention.

The processor 401 exemplarily is configured to define a quantization step size value for a picture, create a map representing variations of quantization step sizes among blocks within the picture ($\Delta$QP map), and create a rounding offset map (RO map) representing rounding offset values for respective blocks in the picture, said rounding offset values being based on a first characteristic, such as a measure of smoothness, of respective blocks. The rate control module 470 exemplarily is configured to calculate a base quantization step size index (base QP) based on the created $\Delta$QP map and RO map. The encoder 400, for example, the entropy coding 410, encodes each block using the calculated base quantization step size index (base QP), corresponding variation of quantization step size from said $\Delta$QP map, and corresponding rounding offset value from said RO map.

The processor 401 can be further configured to calculate a quantization step size value for each block in the picture according to a second characteristic, such as texture or measure of activity or both, of each block and the quantization step size value for the picture. In this case, the encoder 400 encodes each block in response to the quantization step size value and rounding offset value for each block.

Figure 5:
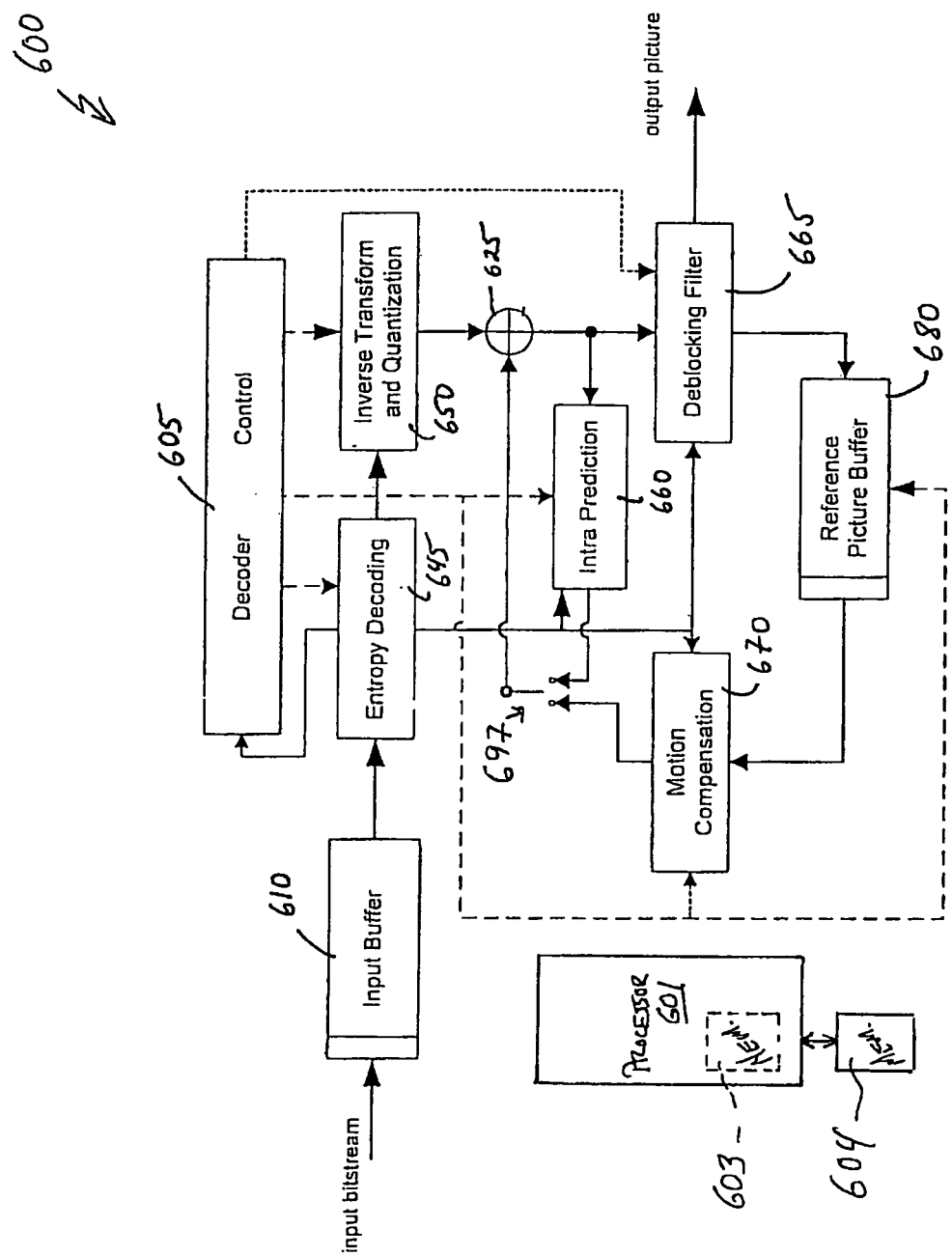
FIG. 5 is a block diagram showing an exemplary video decoder to which the present principles may be applied, in accordance with an implementation of the present principles.

The processor 401 can be further configured to calculate a rounding offset value of the picture according to the quantization step size value for said picture, and to calculate a rounding offset difference for each block. The processor 401 then determines the rounding offset for a particular block by adding the rounding offset value of the picture to the rounding offset difference for the particular block We note that an encoder is principally described in the above discussion of implementations. However, a corresponding decoder may be implemented for each such encoder and/or encoding operation. For example, a decoder or decoding operation is contemplated and envisioned, and implicitly described in this application that is able to decode the encoded bitstream/data. Additionally, variations of such decoders, and decoding operations are also included in the scope of this application. FIG. 5 shows an example of such decoder.

Turning to FIG. 5, an exemplary video decoder to which the present principles may be applied is indicated generally by the reference numeral 600. The video decoder 600 includes an input buffer 610 having an output connected in signal communication with a first input of the entropy decoder 645. A first output of the entropy decoder 645 is connected in signal communication with a first input of an inverse transformer and inverse quantizer 650. An output of the inverse transformer and inverse quantizer 650 is connected in signal communication with a second non-inverting input of a combiner 625. An output of the combiner 625 is connected in signal communication with a second input of a deblocking filter 665 and a first input of an intra prediction module 660. A second output of the deblocking filter 665 is connected in signal communication with a first input of a reference picture buffer 680. An output of the reference picture buffer 680 is connected in signal communication with a second input of a motion compensator 670.

A second output of the entropy decoder 645 is connected in signal communication with a third input of the motion compensator 670 and a first input of the deblocking filter 665. A third output of the entropy decoder 645 is connected in signal communication with an input of a decoder controller 605. A first output of the decoder controller 605 is connected in signal communication with a second input of the entropy decoder 645. A second output of the decoder controller 605 is connected in signal communication with a second input of the inverse transformer and inverse quantizer 650. A third output of the decoder controller 605 is connected in signal communication with a third input of the deblocking filter 665. A fourth output of the decoder controller 605 is connected in signal communication with a second input of the intra prediction module 660, with a first input of the motion compensator 670, and with a second input of the reference picture buffer 680.

An output of the motion compensator 670 is connected in signal communication with a first input of the switch 697. An output of the intra prediction module 660 is connected in signal communication with a second input of the switch 697.

The output of the switch 697 is further connected in signal communication with a first non-inverting input of the combiner 625.

An input of the input buffer 610 is available as an input of the decoder 600, for receiving an input bitstream. A first output of the deblocking filter 665 is available as an output of the decoder 600, for outputting an output picture.

The rounding offset can be used in, for example, decoder 600 for reconstructing the video or for post-processing. Under this circumstance, the rounding offsets should be embedded in the bitstream (e.g., by encoder 400) and conveyed to decoder 600. In one embodiment, one rounding offset can be set for each picture or a group of pictures. In another embodiment, the rounding offset can be set for each macroblock and its actual value or index is sent for each macroblock.

The decoder 600 also includes some computational capabilities in the form of at least one processor 601 in bi-directional communication with a memory 604. Alternatively, the memory could be on board or part of the processor 601, as shown in the example of FIG. 5 with memory 603. Those of skill in the art will appreciate that all of the above described components of the decoder 600 are in signal communication with the processor 601 which functions as the primary controller of the decoding operation according to the implementations of the present invention.

Additional Implementations

We thus provide one or more implementations having particular features and aspects. However, features and aspects of described implementations may also be adapted for other implementations.

For example, several of the implementations and features described in this application may be used in the context of depth coding. However, these implementations and features may be used in the context of coding video and/or coding other types of data. Additionally, these implementations and features may be used in the context of, or adapted for use in the context of, the H.264/MPEG-4 AVC (AVC) Standard, the AVC standard with the MVC extension, the AVC standard with the SVC extension, a 3DV standard, and/or with another standard (existing or future), or in a context that does not involve a standard. We thus provide one or more implementations having particular features and aspects. However, features and aspects of described implementations may also be adapted for other implementations.

Additionally, other measures of distortion may be used, as well as other manners of calculating or estimating distortion. Further, implementations may signal information using a variety of techniques including, but not limited to, SEI messages, slice headers, other high level syntax, non-high-level syntax, out-of-band information, datastream data, and implicit signaling. Accordingly, although implementations described herein may be described in a particular context, such descriptions should in no way be taken as limiting the features and concepts to such implementations or contexts.

Reference in the specification to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this disclosure and are within the scope of this disclosure.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

Implementations of the various processes and features described herein may be embodied in a variety of different equipment or applications, particularly, for example, equipment or applications associated with data encoding and decoding. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

What is claimed is:

1. An encoder comprising:
   a processor and associated memory, the processor configured to:
      define a quantization step size value for a picture,
      create a map representing variations of quantization step sizes among blocks within the picture ($\Delta$QP map),
      calculate a rounding offset value of the picture according to the quantization step size value for said picture,
      calculate a rounding offset difference for each block of the picture;
      create a rounding offset map (RO map) representing rounding offset values for respective blocks in the picture, said rounding offset values being based on a first characteristic of respective blocks; and
   a rate control module configured to calculate a base quantization step size index (base QP) based on the created $\Delta$QP map and RO map;
   said encoder encoding each block using the calculated base quantization step size index (base QP), corresponding variation of quantization step size from said $\Delta$QP map, and corresponding rounding offset value from said RO map.

2. The encoder of claim 1, wherein said first characteristic comprises a measure of smoothness of each of the picture.

3. The encoder of claim 1, wherein said processor is further configured to calculate a quantization step size value for each block in the picture according to a second characteristic of each block and the quantization step size value for the picture, said encoder encoding each block in response to the quantization step size value and rounding offset value for each block.

4. The encoder of claim 3, wherein the second characteristic comprises texture of each block of the picture.

5. The encoder of claim 1
   wherein the definition of the rounding offset for a particular block is determined by adding the rounding offset value of the picture to the rounding offset difference for the particular block.

* * * * *